Nov. 10, 1953        A. S. CHIPLEY        2,658,383
FREEZING POINT TESTER
Filed June 2, 1950
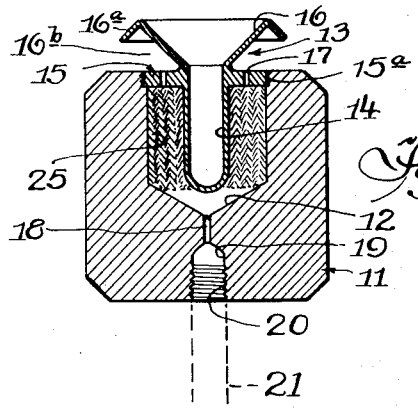
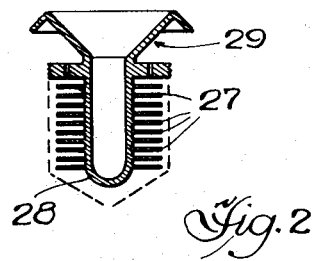
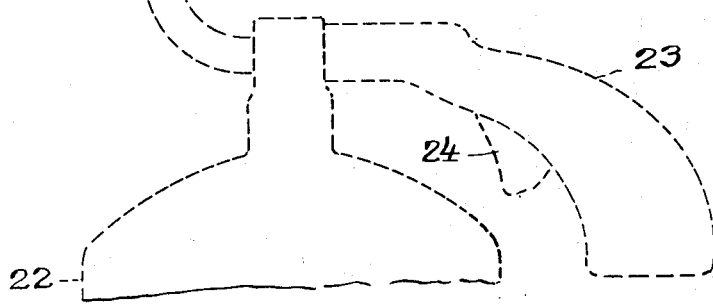
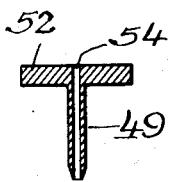
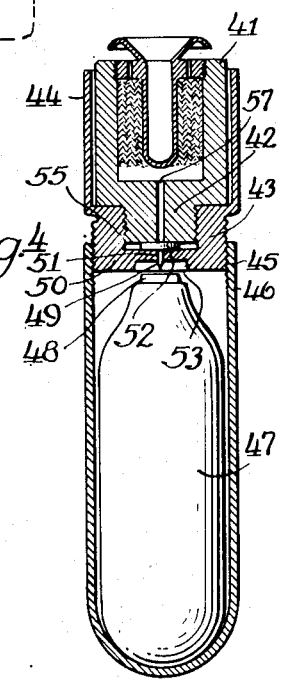
Inventor
Alfred S. Chipley
By: Jones, Peach, Darbo Attys.

Patented Nov. 10, 1953

2,658,383

UNITED STATES PATENT OFFICE 2,658,383

FREEZING POINT TESTER

Alfred S. Chipley, Mundelein, Ill., assignor to Burgess-Manning Company, Libertyville, Ill., a corporation of Illinois Application June 2, 1950, Serial No. 165,834

11 Claims. (Cl. 73—17)

This invention relates to improvements in a freezing point tester or device for determining the freezing point of a liquid or liquid mixture and finds special utility in providing means for quickly and conveniently ascertaining the freezing points of radiator anti-freeze solutions for automobiles or of battery electrolytes.

Among other objects, the invention aims to provide an improved and simplified device of this character capable of embodiment in forms which may be economically manufactured and conveniently used either by a garage or service station attendant or by the home user. It enables garage and service station attendants to show a customer the freezing point, for example, of his radiator anti-freeze solution on an ordinary thermometer.

These and other objects and advantages of the invention will be apparent from the following description, taken together with the accompanying drawings, of illustrative embodiments thereof, and in which drawings—

Figure 1 is a view of one form of the device following the present invention, being a vertical sectional view thereof, of, say, actual size, and showing in broken lines a source of refrigerant;

Figure 2 shows a modified construction of parts shown in Fig. 1;

Figure 3 shows a gun-like holder for parts shown in Fig. 1, the holder also having means for carrying a thermometer ready for use and an adapter device for attachment to a refrigerant source;

Figure 4 shows a simple integrated device specially adapted for home use.

Figure 5 is an enlarged sectional view of one of the parts shown in Fig. 4.

Referring in detail to illustrative constructions shown in the drawings, and turning first to Fig. 1, the numeral 11 following the present invention, indicates a body of heat insulating material such as a phenolic condensation product or other suitable plastic having at its upper end a cavity 12. Received in the cavity 12 is a liquid receptacle 13 having a relatively deep cut portion 14 telescopically received in the cavity 12 which is also relatively deep to accommodate the cup, although the cup is of less depth than the cavity. The receptacle cup desirably is of somewhat tubular shape, closed at its lower end, and is preferably of metal for good heat transfer properties.

The cavity 12 and cup portion 14 of the receptacle are conveniently cylindrical, and the receptacle 13 may be supported in a cavity 12, spaced from the walls thereof, by a washer-like support 15, that, in this instance, is shown integral with the receptacle 13 and at the upper end of the cup portion 14. Above this portion, the receptacle 13 desirably flares outwardly in a funnel-like mouth portion 16, having a turned over margin 16a. Vent holes 17 are provided in the support 15. The support 15 may be peripherally threaded as at 15a to screw into the upper end of the cavity 12 which is matingly interiorly threaded. The space 16b around the upper end of the receptacle 13 provides an escape for the gas vented through the holes 17.

The body 11 has an axial orifice 18 communicating with the cavity 12 and its counterbore 19 is threaded as at 20 to have screwed thereinto one end of the tube 21 which is in communication with a conventional container 22 for a supply of refrigerant or refrigerating medium, preferably liquid carbon dioxide, under relatively high pressure. This may be a standard $CO_2$ fire extinguisher with a pistol handle 23 and release trigger 24. The parts 21 to 24 being conventional, as shown somewhat diagrammatically.

It will be understood that when the trigger 24 is actuated the liquid carbon dioxide under pressure will escape from the container through the eduction tube 21 rapidly vaporizing at least in part as it is released from pressure and rising through orifice 18 into the space 12, which forms a refrigerating chamber. The cavity or chamber 12 is thus filled with a mixture of gaseous and solid carbon dioxide, the temperature of the latter, as is commonly known, being $-110°$ F.

Further in accordance with the present invention, in order to distribute the solidified carbon dioxide throughout the chamber 12 and particularly to provide a heat conductive element in this chamber surrounding the cup portion 14 of the liquid receptacle, there is here shown an interstitially constituted element such as the wire screen 25 which may be made up of a plurality of layers of such screen wound around the cup portion 14 within the cavity 12. So arranged, the gaseous refrigerant will flow through the interstices of the element 25 and will form a solidified refrigerant well distributed throughout so that a rapid heat transfer will be effected from the interior of the cup portion 14 to the refrigerant, thus rapidly lowering the temperature of any liquid sample which is placed in the receptacle 13. Such sample may be taken from an automobile cooling system, for example, by an ordinary syringe (eye dropper) and ejected into the receptacle 13.

Since the temperature of the solidified carbon dioxide is far below the freezing point of practically all of the liquids which will be tested thereby, the temperature of the liquid will be quickly brought to that of freezing or to a temperature at which congelation of the liquid begins so that a slush is formed in the cup 14. As this slush begins to form, the temperature of the liquid at its congelation point may be read by means of a small thermometer, such as shown at 26 (Fig. 3) which is inserted in the receptacle 13 with its bulb 26a immersed in the liquid. It may thus be found, for example, that the congelation point is, say, 15° below zero, which would indicate that the anti-freeze solution is suitable for average city winter driving in a given locality. The flared mouth 16 not only facilitates deposit of the liquid in the receptacle and minimizes danger of overflow of the liquid therefrom when the thermometer is placed therein but also serves to augment the chilling effect of the fluid expansion of the carbon dioxide gas.

It will be understood that only a single, so-called "shot" of the refrigerant is necessary for the purpose just described and that the test may be made very quickly, the device being then shaken out to remove the liquid from the receptacle while at the same time the gaseous carbon dioxide or the sublimation product of the solidified carbon dioxide rapidly dissipates and escapes through the vent holes 17.

If desired, the liquid may be allowed to freeze solid under the influence of the refrigerant, and then the point where it thaws and changes to a mushy or slushy state noted as the mass again takes on heat from its surroundings.

In the modification shown in Fig. 2, the interstitially constituted heat conductive element may be in the form of a plurality of fins 27 formed integrally with and about the cup 28 of the receptacle 29.

As shown in Fig. 3, the heat insulating body 30 may be of gun-like form having a pistol-grip handle 31. In this handle may be conveniently provided a slot 32 for holding a thermometer 26, already referred to, in position for instant use. In the form shown in Fig. 3 also a construction is disclosed which may be taken to the automobile to have its receptacle 13 receive the liquid and whereby the device may then be taken to the refrigerant container 22 and connected with the eduction tube 21 of the container. For this purpose, the receptacle 13 is received in a through passage 34 in the body 30 the lower end of which is flared outwardly as at 35 to receive a conical adapter 36, as indicated by the dotted lines 37. The adapter 36 has an axial orifice 38 therethrough which is counterbored and internally threaded as at 39 to be permanently screwed onto the threaded end of the refrigerant container eduction tube 21. Thus, the body 30 may be lifted away from or placed on the adapter 36 that is on the tube 21 and when the trigger 24 is actuated the refrigerant will flow into the refrigerating chamber 40 formed in the through passage 34 when the adapter 36 is inserted therein as shown in full lines in Fig. 3. The device of Fig. 3 functions otherwise as already described with reference to Fig. 1.

In Fig. 4 there is shown a simple integrated device which is particularly adapted for transportation in, say, the tool compartment of an automobile and which has a replaceable cartridge for the refrigerant so that the automobile owner may use it at his home garage, for example, and after use may insert another cartridge for later use.

In the illustrative construction, the heat insulating body 41 has a reduced shank 42 which is exteriorly threaded to be screwed into the interiorly threaded lower end 43 of a sleeve 44 which in turn is also exteriorly threaded as at 45 to be screwed into the threaded upper end of a shell 46. The shell 46 houses a cartridge 47 containing a supply of liquid carbon dioxide under pressure. Such cartridges are available on the market. The upper end of the cartridge may have a diaphragm closure 48 which is adapted to be punctured by a hollow needle 49 axially dependent from the body 41 and passing through the lower wall 50 of the sleeve 44. This lower wall 50 is orificed as at 51 to pass the needle 49 therethrough. The needle 49 may have a head 52 which is clamped in the space 55 between the parts 42 and 43 and may have a bore 54 therethrough.

A recess 53 serves to guide the upper end of the cartridge into engagement with the needle 49 as the sleeve 44 is screwed into the shell 46, whereupon the needle punctures the diaphragm 48. Thereupon, the carbon dioxide vaporizes and passes up through the bore 54 in the needle, through the passageway 57 in the body 41 (aligned with the bore 54) and thus into the chamber surrounding the receptacle cup. The device of Figs. 4 and 5 functions otherwise similarly to the description given with reference to the other figures.

The invention is not intended to be limited to details of construction shown for purposes of exemplification thereof and it is to be understood that such changes may be made as fall within the scope of the appended claims without departing therefrom. For example, any suitable source of carbon dioxide under pressure and other refrigerants may be employed. It is preferable, however, to provide for the withdrawal of the carbon dioxide from the lowermost portion of the container, as the refrigerant is likely to be in liquid form at this location. When larger supply bottles or tanks are used, a tube may extend to the bottom of the container from the outlet valve; when small cartridges or capsules are used, the apparatus may hold them in inverted position during discharge.

The invention having been described, what is here claimed is:

1. In a freezing point tester of the class described, a relatively deep metallic liquid receptacle, a heat insulating body telescopically receiving the receptacle in spaced relation, a metallic interstitially constituted heat conductive element surrounding said receptacle within the body, and means for admitting a charge of refrigerant to said space.

2. In a freezing point tester of the class described, in combination, a heat insulating body having a relatively deep cavity, a liquid receptacle having a relatively deep cup portion supported in said cavity from the upper end thereof spaced from the walls thereof to provide a refrigerating chamber therebetween, an interstitially constituted heat conductive element surrounding the receptacle in the cavity, a sleeve for the body, screw threads on the sleeve, a shell threadedly mating with said sleeve, a refrigerant containing puncturable cartridge in said shell, and a hollow needle for puncturing the cartridge on relative rotation of the sleeve and shell, said body having an orifice communicating both with said cavity and with said shell to permit refrigerant from the cartridge to pass into said cavity.

3. In a freezing point tester of the class described, in combination, a heat insulating body having a cavity, a liquid receptacle having a cup portion supported in said cavity from the upper end thereof spaced from the walls thereof to provide a refrigerating chamber, a sleeve for the body, screw threads on the sleeve, a shell threadedly mating with said sleeve, a refrigerant containing puncturable cartridge in said shell, and a needle carried by the sleeve for puncturing the cartridge on screw threaded relative rotation of the sleeve and shell, said body having an orifice communicating both with said cavity and with said shell to permit refrigerant from the punctured cartridge to pass into said chamber.

4. In a freezing point tester of the class described, a relatively deep metallic liquid receptacle, a heat insulating body telescopically receiving the receptacle in spaced relation, a metallic interstitially constituted heat conductive element surrounding said receptacle within the body, the heat conductive element being in the form of a plurality of layers of metallic screen, and means for admitting a charge of refrigerant to the space between the body and the receptacle.

5. In a freezing point tester of the class described, a relatively deep metallic liquid receptacle, a heat insulating body telescopically receiving the receptacle in spaced relation, a metallic interstitially constituted heat conductive element surrounding said receptacle within the body, the heat conductive element being in the form of a plurality of fins integral with said receptacle, and means for admitting a charge of refrigerant to the space between the body and the receptacle.

6. In a freezing point tester of the class described, a metallic liquid receptacle, a heat insulating body receiving the receptacle in spaced relation, a metallic interstitially constituted heat conducted element surrounding said receptacle within the body, the receptacle being supported in the body by a washer-like support member having vent holes therein, and means for admitting a charge of the refrigerant to the space between the body and the receptacle.

7. In a freezing point tester of the class described, a relatively deep metallic liquid receptacle, a heat insulating body telescopically receiving the receptacle in spaced relation, a metallic interstitially constituted heat conductive element surrounding said receptacle within the body, the body being of pistol shape having a handle and the handle being slotted to receive a thermometer, and means for admitting a charge of refrigerant to the space between the body and the receptacle.

8. In a freezing point tester, in combination, a heat insulating body having a cavity, a liquid receptacle having a cup portion supported in said cavity from the upper end thereof spaced from the walls thereof to provide a refrigerating chamber therebetween, a heat conductive element surrounding the receptacle in the cavity, a sleeve for the body, screw threads on the sleeve, a shell threadedly mating with said sleeve, the body also having screw threaded engagement with the sleeve, a refrigerant containing puncturable cartridge in said shell, and a hollow needle carried by the sleeve for puncturing the cartridge, said body having an orifice communicating both with said cavity and with said shell to permit refrigerant from the cartridge to pass into said cavity.

9. In a freezing point tester, in combination, a heat insulating body having a cavity, a liquid receptacle having a cup portion supported in said cavity spaced from the walls thereof to provide a refrigerating chamber therebetween, cylindrical means surrounding the body having screw threads thereon, a shell threadedly mating with said means, said cylindrical means having a base portion having a centrally perforated lower wall and an internally threaded counterbore above said wall, the body having an externally threaded depending shank screwed in said counterbore, and a hollow needle axially disposed on said lower wall passing into said shell through the perforation in the lower wall and held thereon by said body, said body having an orifice communicating through said hollow needle with said shell and communicating also with said cavity.

10. In a freezing point tester, in combination, a heat insulating body having a relatively deep cavity, a liquid receptacle having a relatively deep cup portion supported in said cavity from the upper end thereof spaced from the walls thereof to provide a refrigerating chamber therebetween, a heat conductive element surrounding the receptacle in the cavity, a sleeve for the body, screw threads on the sleeve, a shell threadedly mating with said sleeve, the sleeve having a base portion having a centrally perforated lower wall and an internally threaded counterbore above said wall, the body having an externally threaded depending shank screwed in said counterbore, a hollow needle axially disposed on said lower wall and passing through said perforation in the lower wall, and a head on said needle clamped between body depending shank and said lower wall on screw threaded engagement of the body in the said counterbore, said body having an orifice communicating through said hollow needle with said shell and also communicating with said cavity.

11. In a freezing point tester, in combination, a heat insulating body having a cavity, a liquid receptacle having a cup portion supported in said cavity from the upper end thereof spaced from the walls thereof to provide a refrigerating chamber, an interstitially constituted heat conductive element surrounding the receptacle in the cavity, a sleeve for the body, screw threads on the sleeve, a shell threadedly mating with said sleeve, said shell being adapted to carry a refrigerant containing puncturable cartridge, and an axially disposed hollow needle carried by the sleeve for puncturing the cartridge on screw threaded relative rotation of the sleeve and shell, said body having an orifice communicating through said needle with said shell and also communicating with said cavity to permit refrigerant from the punctured cartridge to pass into said chamber.

ALFRED S. CHIPLEY.

References Cited in the file of this patent

UNITED STATES PATENTS

| Number | Name | Date |
| --- | --- | --- |
| 2,297,641 | Webber | Sept. 29, 1942 |

FOREIGN PATENTS

| Number | Country | Date |
| --- | --- | --- |
| 193,077 | Germany | Dec. 14, 1907 |